United States Patent
Mullin (10) Patent No.: US 7,671,555 B2
(45) Date of Patent: Mar. 2, 2010

(54) MOTOR, A METHOD OF OPERATING A MOTOR, AND A SYSTEM INCLUDING A MOTOR

(75) Inventor: Paul Steven Mullin, Yellow Springs, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 323 days.

(21) Appl. No.: 11/613,032

(22) Filed: Dec. 19, 2006

(65) Prior Publication Data

US 2007/0152613 A1    Jul. 5, 2007

Related U.S. Application Data

(60) Provisional application No. 60/752,680, filed on Dec. 21, 2005.

(51) Int. Cl.
G05D 23/00    (2006.01)
(52) U.S. Cl. .................. 318/471; 318/801; 236/51; 236/67; 236/72
(58) Field of Classification Search ............. 318/801, 318/471; 236/51, 72, 67, 74
See application file for complete search history.

(56) References Cited

U.S. PATENT DOCUMENTS

| | | | |
|---|---|---|---|
| 4,380,156 A * | 4/1983 | Ecker | ............ 62/235.1 |
| 4,909,041 A | 3/1990 | Jones | |
| 4,910,966 A | 3/1990 | Levine et al. | |
| 4,942,613 A * | 7/1990 | Lynch | ............ 700/278 |
| 5,202,951 A | 4/1993 | Doyle | |
| 5,473,229 A | 12/1995 | Archer et al. | |
| 5,533,352 A | 7/1996 | Bahel et al. | |
| 5,592,058 A | 1/1997 | Archer et al. | |
| 5,847,526 A * | 12/1998 | Lasko et al. | ............ 318/471 |
| 5,874,526 A * | 2/1999 | Koolen et al. | ............ 530/300 |
| 6,108,614 A * | 8/2000 | Lincoln et al. | ............ 702/183 |
| 6,318,965 B1 * | 11/2001 | Nair | ............ 417/2 |
| 6,356,044 B1 | 3/2002 | Archer | |
| 6,392,372 B1 | 5/2002 | Mays, II | |
| 6,545,438 B1 | 4/2003 | Mays, II | |
| 6,751,888 B2 * | 6/2004 | Lueckenbach | ............ 34/595 |
| 6,895,176 B2 | 5/2005 | Archer et al. | |

(Continued)

OTHER PUBLICATIONS

Table 5-1, Terminal Markings For Low-Voltage Class 2 Controls, DC Mar. 2003, p. 16, National Electrical Manufacturers Association.

(Continued)

*Primary Examiner*—Rita Leykin
(74) *Attorney, Agent, or Firm*—Michael Best & Friedrich LLP (57) ABSTRACT

An air movement system including a blower and an external controller operable to receive signals from a sensing device and generate a command based on the received signals. The command includes an address. The system also includes a communication channel coupled to the external controller and configured to communicate the command, and a motor assembly operable to drive the blower. The motor assembly includes a stator and rotor assembly coupled to the blower, and a drive circuit coupled to the stator and rotor assembly. The motor assembly includes a second controller and a memory. The memory includes a set of data having a plurality of addresses and an instruction associated with each address, respectively.

51 Claims, 6 Drawing Sheets

U.S. PATENT DOCUMENTS

| | | |
|---|---|---|
| 6,945,058 B2 | 9/2005 | Bash et al. |
| 7,106,019 B2 | 9/2006 | Becerra et al. |
| 7,161,316 B2 | 1/2007 | Archer et al. |
| 2002/0117986 A1 | 8/2002 | Becerra et al. |
| 2004/0189221 A1 | 9/2004 | Kurosawa et al. |
| 2005/0244263 A1 | 11/2005 | Hardt et al. |
| 2005/0257540 A1 | 11/2005 | Choi et al. |
| 2005/0269994 A1 | 12/2005 | Ishishita |
| 2006/0185373 A1* | 8/2006 | Butler et al. .................. 62/181 |
| 2007/0131784 A1* | 6/2007 | Garozzo et al. ............... 236/51 |

OTHER PUBLICATIONS

International Search Report and Written Opinion of the International Searching Authority for PCT/US2006/048508 dated Jun. 18, 2007 (11 pages).

* cited by examiner

MOTOR, A METHOD OF OPERATING A MOTOR, AND A SYSTEM INCLUDING A MOTOR

RELATED APPLICATIONS

This application claims the benefit of U.S. Provisional Patent Application No. 60/752,680; filed on Dec. 21, 2005.

BACKGROUND

The present invention relates to a motor, a system for operating a driven device (e.g., a blower or fan of an air-movement system) where the system includes the motor, and a method of operating the motor Standard operating conditions for heating, ventilation, and/or air conditioning systems (referred to herein as HVAC systems) generally vary over relatively short periods of time. It is typically preferred to adjust the cooling and heating cycles, among other parameters, of the HVAC systems as conditions vary. For example, some thermostats are configured to generate a signal indicative of a cooling requirement. In response to the signal generated by the thermostat, the motor of the HVAC system operates a fan or a blower to move a constant air flow through the system. Alternatively, the motor may operate to produce a constant torque, operate at a desired voltage, or rotate the fan or blower at a constant speed.

An HVAC system is an example of an air-movement system. Other example air-movement systems include furnaces, heat pumps, blowers for gas-fired appliances (e.g., a gas water heater), etc.

SUMMARY

In one embodiment, the invention provides an air-movement system having a temperature sensing device (e.g., a thermostat) and a motor assembly driving an element (e.g., a fan or blower). The system may also include a system control board. The thermostat is operable to generate signals indicative of, for example, cooling and/or heating requirements of an HVAC system. The thermostat can communicate the signals to the other components of the system. For example, the thermostat can communicate the signals to the motor assembly and/or the system control board. The system control board can include a controller, input/output peripherals, and configuration devices or ports. The system control board is operable to receive the signals from the thermostat, process the signals, and generate instructions based on the signals. The system control board can also be configured to maintain communications with the motor assembly, to send the generated instructions to the motor assembly, and to receive signals from the motor assembly. The motor assembly can include an electrically-commuted motor (ECM) such as a brushless permanent magnet motor. The communication between the system control board and the motor assembly can be via a serial port. The instructions to the motor assembly can include a command and state relating to the thermostat status.

In another embodiment, the invention provides an air movement system including a blower, and an external controller operable to receive signals from a sensing device. The external controller generates a command based on the received signals, where the command includes an address. The movement system also includes a communication channel coupled to the external controller and configured to communicate the command, and a motor assembly operable to drive the blower. The motor assembly has a stator and rotor assembly coupled to the blower, and a drive circuit coupled to the stator and rotor assembly. The drive circuit also has a second controller and a memory. The memory includes a set of data with a plurality of addresses and an instruction associated with each address, respectively, of the plurality of addresses. The second controller is coupled to the communication channel and is configured to receive the command to obtain an instruction from the set of data using the address of the command. The second controller is also operable to drive the stator and rotor assembly based on the obtained instruction.

In another embodiment, the invention provides a method for assembling an air movement system. The method includes providing an external controller operable to receive signals from a sensing device, and generate commands based on the received signals. The command includes an address. The method also includes providing a motor assembly with a stator and rotor assembly operable to drive a blower, and a drive circuit with a second controller and a memory. The method also includes coupling the external controller to the second controller with a communication channel, programming the memory with a first set of data corresponding to characterization data of the air movement system, and programming the memory with a second set of data. The second set of data includes a plurality of addresses and an instruction associated with each address, respectfully, of the plurality addresses.

In another embodiment, the invention provides a method of operating an air movement system including a blower, an external controller, and a motor assembly. The motor assembly includes a stator and rotor assembly coupled to the blower, and a drive circuit coupled to the stator and rotor assembly. The drive circuit has a second controller coupled to the external controller via a communication channel, and a memory with a first set of data having a plurality of addresses and an instruction associated with each address, respectively, and a second set of data corresponding to characterization data of the air movement system. The method includes receiving a first signal with the external controller, and generating a command based on the first signal, where the command including an address. The method also includes transmitting a second signal from the external controller to the second controller, where the second signal includes the command, processing the second signal, and selecting an instruction from the first set of data based on the address of the command and the plurality of addresses of the set of data. The method also includes driving the blower with the motor according to the selected instruction.

In another embodiment, the invention provides a method of operating an air movement system including a blower, an external controller, and a motor assembly. The motor assembly includes a stator and rotor assembly coupled to the blower, and a drive circuit coupled to the stator and rotor assembly. The drive circuit has a second controller coupled to the external controller. The second controller has a first set of data with a plurality of addresses and an instruction associated with each address, respectively, and a second set of data corresponding to characterization data of the air movement system. The movement system also includes a thermostat coupled to the external controller. The method includes receiving a first signal from the thermostat with the external controller, generating a command based on the first signal, where the command including a status portion, and sending a second signal including the command from the external controller to the second controller. The method also includes processing the second signal, selecting an instruction from the first set of data based on the status portion and the plurality of addresses of the first set of data, and driving the blower with the motor according to the selected instruction.

In another embodiment, the invention provides a method of operating an air movement system including a blower, a thermostat, and a motor assembly. The motor assembly includes a stator and rotor assembly coupled to the blower, and a drive circuit coupled to the stator and rotor assembly. The drive circuit has a second controller coupled to the thermostat. The second controller has a first set of data with a plurality of addresses and an instruction associated with each address, respectively, and a second set of data corresponding to characterization data of the air movement system. The method includes receiving a first signal from the thermostat with the external controller, generating a command based on the first signal, where the command includes a status portion, and sending a second signal including the command from the thermostat to the second controller. The method also includes processing the second signal, selecting an instruction from the first set of data based on the status portion and the plurality of addresses of the set of data, and driving the blower with the motor according to the selected instruction.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
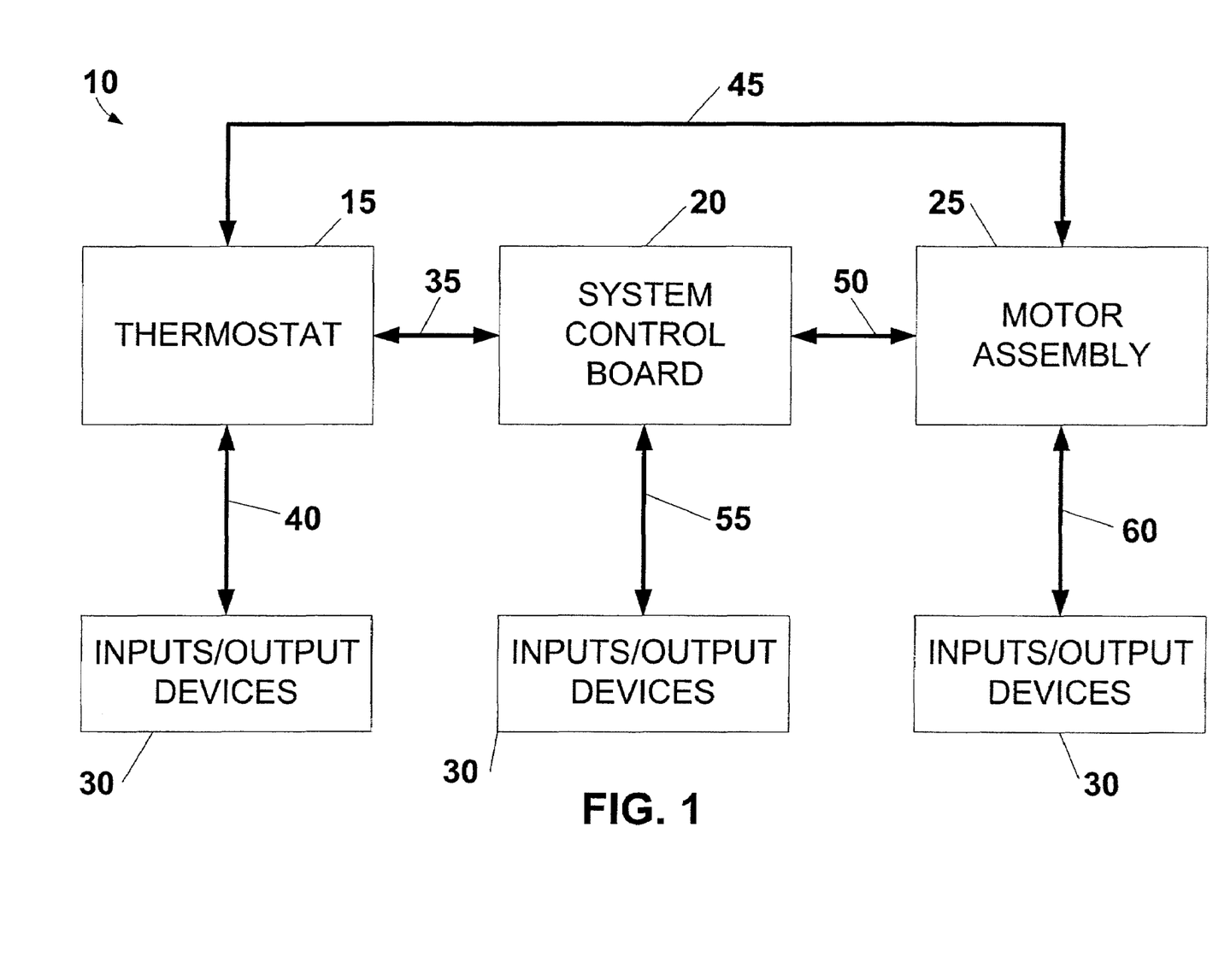
FIG. 1 is a schematic illustration of an HVAC system including a thermostat, system control board, and motor assembly.

FIG. 1 illustrates a HVAC system 10 including a thermostat 15, a system control board 20, a motor assembly 25, and input/output devices 30. The thermostat 15 is coupled to the system control board 20 via a first communication line 35, and to one or more input/output devices 30 via a second communication line 40. Additionally, the thermostat 15 can be coupled directly to the motor assembly 25 via a third communication line 45. The system control board 20 is coupled to the motor assembly 25 via a fourth communication line 50, and to one or more input/output devices 30 via a fifth communication line 55. The motor assembly 25 is couplet to one or more input/output devices 30 via a sixth communication line 60. As shown in FIG. 1, the first, second, third, fourth, fifth, and sixth communication lines 35, 40, 45, 50, 55, and 60 can represent a two-way system communication between the elements described above. Moreover, communication lines 35, 40, 45, 50, 55, and 60 are schematic only, can include analog or digital communication, and can include wire or wireless communication.

Each one of the input/output devices 30 is also a schematic representation of input signals, output signals, and auxiliary devices operating in connection with the thermostat 15, the system control board 20, and the motor assembly 25. Accordingly, more than one implementation of the construction of the HVAC system 10 is shown in FIG. 1. Moreover, other constructions of the HVAC system 10 can be possible by utilizing one, or a combination, of the primary devices (e.g. thermostat 15, system control board 20, and motor assembly 25) and a number of input/output devices 30. Additionally, it is envisioned that the primary devices discussed further below (e.g., the motor assembly 25) can be used in other applications, either independently or simultaneously with respect to the operation of the HVAC system 10.

Figure 2:
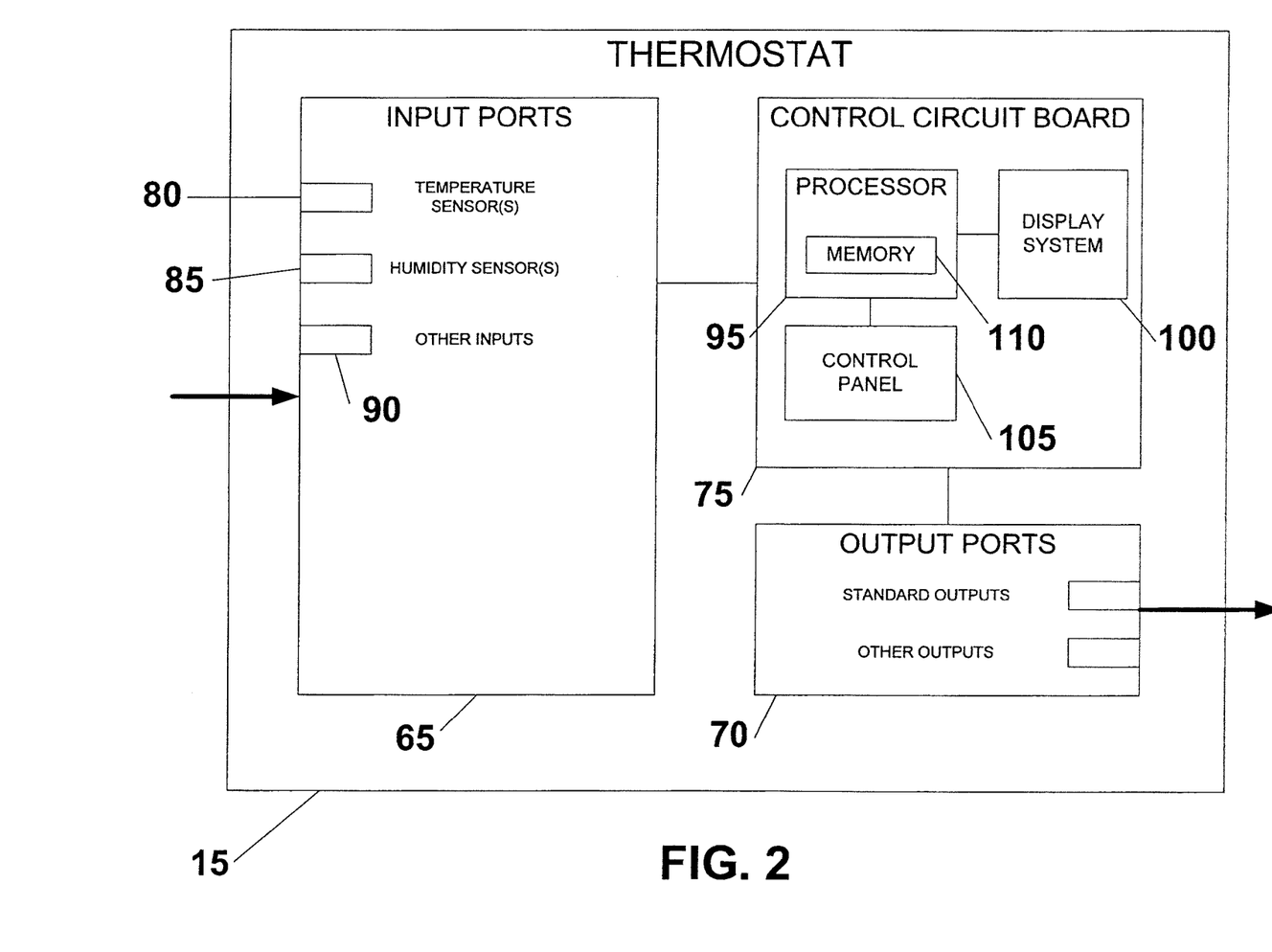
FIG. 2 is a schematic illustration of a thermostat capable of being used in the HVAC system of FIG. 1.

FIG. 2 illustrates a schematic representation of the thermostat 15 including input ports 65, output ports 70, and a controller or a control circuit board 75. The input ports 65 of the thermostat 15 can include ports to receive signals generated by temperature sensors (port 80), humidity sensors (port 85), or other sensors (port 90). Temperature sensors generally dictating the operation of the thermostat 15 can be defined in one physical embodiment with the thermostat 15. In some applications, the thermostat 15 can obtain signals wirelessly from temperature sensors in remote locations. The thermostat 15 can also receive signals, indicative of humidity levels, generated by sensors incorporated or coupled to the thermostat 15, or located at remote locations. Other inputs that the thermostat 15 is operable to receive can include: power from a battery through a power interface, software updates through a dedicated communications port, and status request signals to actively monitor and control the thermostat 15 from a remote location, for example.

The input ports 65 of the thermostat 15 are couple to the controller 75, which includes a processor 95, a display system 100, and a control panel 105. The processor 95 can process signals received at the input ports 65. The processor 95 can include a memory 110 generally allowing the processor 95 to store instructions and settings. In some constructions, the controller 75 can include a storage device or memory (not shown) separate from the processor memory 110 to store additional information such as instructions to operate the thermostat or a set of thermostat readings from the input ports 65 over a predetermined period of time. The control panel 105 can be used, for example, to operate the thermostat 15 or to adjust operation settings stored in the memory 110 of the thermostat 15. For that purpose, the control panel 105 can include switches, dial knobs, or other suitable devices allowing a user to operate the thermostat 15 or manipulate the settings of the thermostat 15. In some constructions, the display system 100 can include an LCD display connected to the controller 75 through the processor 110. The display system 100 can be used to display information as instructed by the processor 100. More specifically, the information displayed by the display system 100 can include settings of the thermostat 15, numeric values indicative of input signals (e.g. temperature, humidity levels, power level, warnings), or other information generated and sent by the processor 95.

The output ports 70 of the thermostat 15 can include a set of ports to send output signals generated by the thermostat 15. For example, the output signals generated by the thermostat 15 can include signals indicative of the status of the HVAC system 10 based on the input signals (e.g. ambient temperature and/or humidity levels) received by the thermostat 15. The thermostat 15 can generate output signals, for example heating (W) and cooling (Y), such that the signals can be interpreted by receiving devices (e.g. the system control board 20) as being "on" or "off." For example, the thermostat can generate a signal W (i.e., a request for heating) through one of the output ports 70. The signal W can be interpreted by the system control board 20, and as a result, the system control board 20 can generate a signal instructing or causing the motor assembly 25 to operate. In the case when the thermostat 15 does not generate a signal W (interpreted as the signal W being "off"), the system control board 20 can generate a signal instructing or causing the motor assembly 25 to stop operation, for example. In some constructions, the thermostat 15 is configured to generate signals indicative of requests of different levels of heating or cooling. For example, the thermostat 15 can generate signals W1, W2, and W3, usually indicating requests for three different levels of heating. Other standard output signals of the thermostat 15 can include a fan signal (G), a defrost signal (DF), an outdoor thermistor signal (T), and an emergency heat relay signal (E). The output ports 70 of the thermostat 15 can also include ports for computer interfaces to provide status checks or instructions to other input/output devices 30 coupled to the thermostat 15.

It is to be understood that the thermostat 15 illustrated in FIG. 2 represents only one exemplary construction, and thus other constructions are possible. For example, the thermostat 15 can include a single circuit board supporting the elements described above, such as the input ports 65, output ports 70, and a user interface having a control panel 105 and a display system 100. In another construction, the thermostat 15 can be controlled by alternative means other than processor 95. Yet other constructions can include additional input and output ports to receive and send signals indicative of humidity levels and other status checks. Furthermore, the thermostat 15 can include interfaces other than the ones illustrated in FIG. 2, such as a serial port for communicating with other computers or suitable devices. Other constructions of the HVAC system 10 can include a relatively less sophisticated thermostat 15, such that the thermostat 15 includes a temperature sensor, a mode switch, a fan switch, and a circuit connecting the elements and generating standard switch outputs to be sent to the system control board 20.

Figure 3:
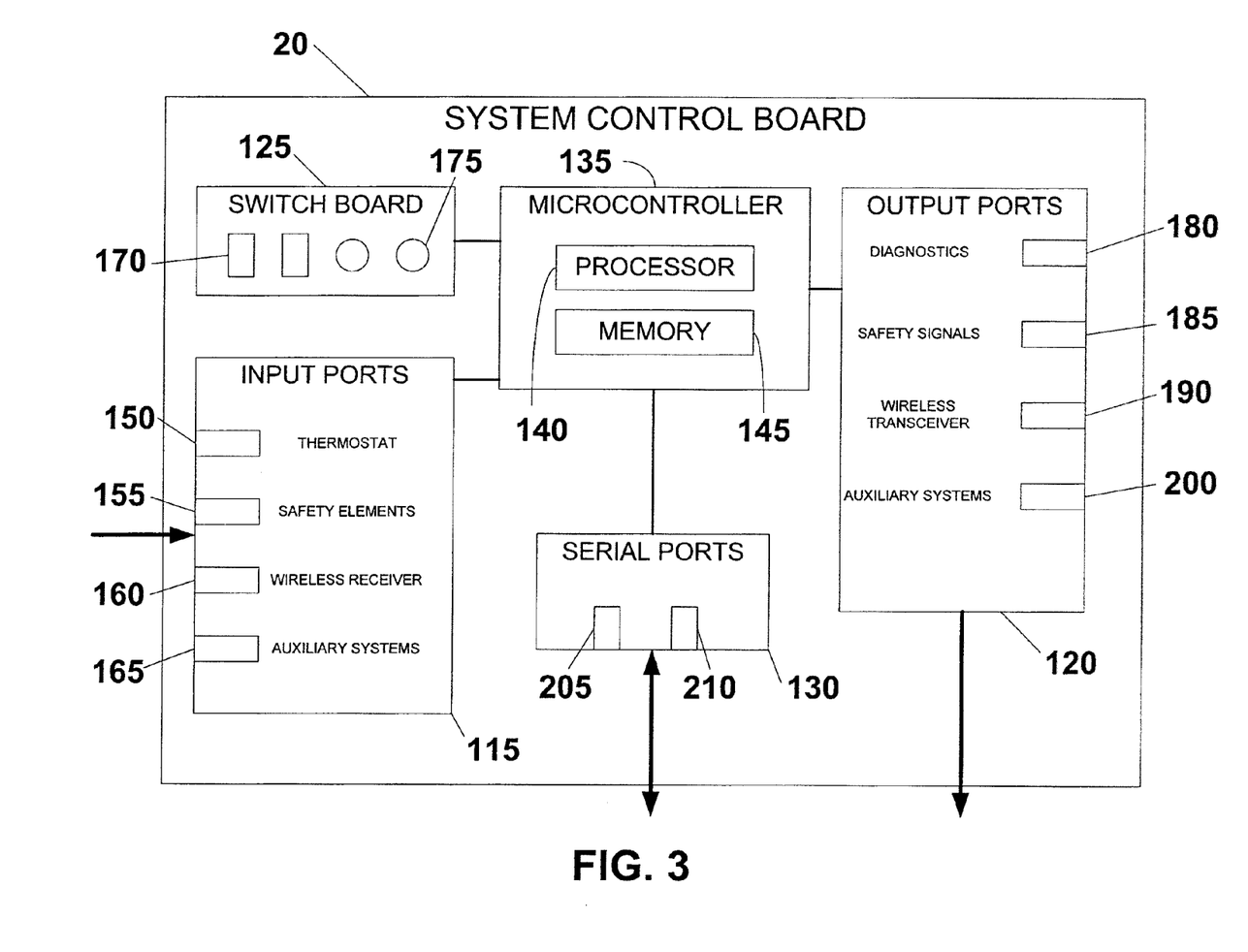
FIG. 3 is a schematic illustration of a system control board capable of being used in the HVAC system of FIG. 1.

FIG. 3 is a schematic representation of the system control board 20 including input ports 115, output ports 120, a switch board 125, serial ports 130, and a controller 135 having a processor 140 and a memory 145. In the illustrated construction, the system control board 25 can relay signals generated by the thermostat 15 to the motor assembly 25. More specifically, the system control board 20 processes the signals from the thermostat 15 and generates instructions for operating the motor assembly 25. The system control board 20 can also be operable to communicate with other input/output devices 30, such as humidity control systems, gas burner controls, gas ignition systems, other motors, safety systems, service systems, and combustion blowers. Accordingly, the system control board 20 can generate instructions for the motor assembly 25 based on signals received from the thermostat 15, as well as signals received from alternative devices coupled to the system control board 20, such as safety systems, ambient sensors, gas ignition systems, and other HVAC system components.

The input ports 115 of the system control board 20 can include ports to receive thermostat signals (port 150), and safety signals (port 155—e.g. from temperature sensors, motion sensors, smoke sensors). The input ports 115 can also include ports to receive wireless signals (port 160) to reprogram the processor 140 or update information in the memory 145 of the controller 135. The input ports 115 can also include other ports (port 165) to receive signals from auxiliary systems, such as gas ignition systems, gas burner controls, and humidity control systems.

The switch board 125 of the system control board 20 can include a plurality of switches 170 and dial knobs 175. A user can configure, update, or modify the settings of the system control board 20 utilizing the switch board 125. The status of the switch board 125 can define specific operational modes of the system control board 20 by dictating, for example, what input ports 115 are operable to receive signals, what processes the processor 140 can utilize to analyze the signals received, and what auxiliary devices the system control board 20 can communicate with. It is to be understood that other functions of the system control board 20 not described can also be controlled my manipulating the switch board 125.

The output ports 120 of the system control board 20 are operable to send signals to the motor assembly 25 and other input/output devices 30, such as equipment or systems operating in cooperation with the system control board 20 and simultaneously with the HVAC system 10. For example, the output ports 120 can include a port to send diagnostic requests (port 180) to safety systems, motor assemblies (e.g. motor assembly 25), and gas ignition systems. The system control board 20 can utilize one of the output ports 120 to send signals to an alarm system or safety equipment (port 185). Another one of the output ports 120 can be connected to a wireless transceiver (port 190) to send signals indicative of diagnostics or operational status of the system control board 20, for example. The system control board 20 can also utilize one of the output ports 120 to send instructions to auxiliary systems (port 200) such as other HVAC systems, humidity control systems, and motors.

In some constructions of the HVAC system 10, the system control board 20 communicates with the motor assembly 25 utilizing one of the serial ports. More specifically, the system control board 20 and the motor assembly 25 can be coupled via a serial cable. In some cases, the system control board 20 can generate and send instructions to the motor assembly 25, as well as receive diagnostics from the motor assembly 25 via the same serial port (port 205 of the serial ports 130, for example). In other cases, the motor assembly 25 and the system control board 20 can send and receive other information besides instructions and diagnostics utilizing the serial ports 130 based on an operational mode of the system control board 20. Yet other constructions of the HVAC system 10 can include the system control board 20 communicating with the motor assembly 25 utilizing the input ports 115 and output ports 120 of the system control board 20.

It is envision that a user or a technician can utilize the serial ports 130 to program the system control board 20. In this particular case, a connection between the system control board 20 and the motor assembly 25 through the serial ports 130 may be disabled while programming the system control board 20. It is also envision that the system control board 20 includes additional serial ports (e.g. port 210), thus allowing the user or technician to program the system control board 20 without interrupting the communication between the system control board 20 and the motor assembly 25.

A user or technician can generally dictate the modes of operation of the system control board 20 by manipulating the switch board 125. However, in other cases, the controller 135 can be programmed utilizing alternatively the switch board 125, a port of the input ports 115, a port of the output ports 120, or the serial ports 130 as indicated above. In some constructions of the HVAC system 10, the memory 145 in the controller 135 can store instructions allowing the system control board 20 to operate the motor assembly 25 based on signals generated by the thermostat 15, and simultaneously operate other systems schematically illustrated in FIG. 1 as the input/output devices 30 coupled to the system control board 20 via communication line 55.

Figure 4:
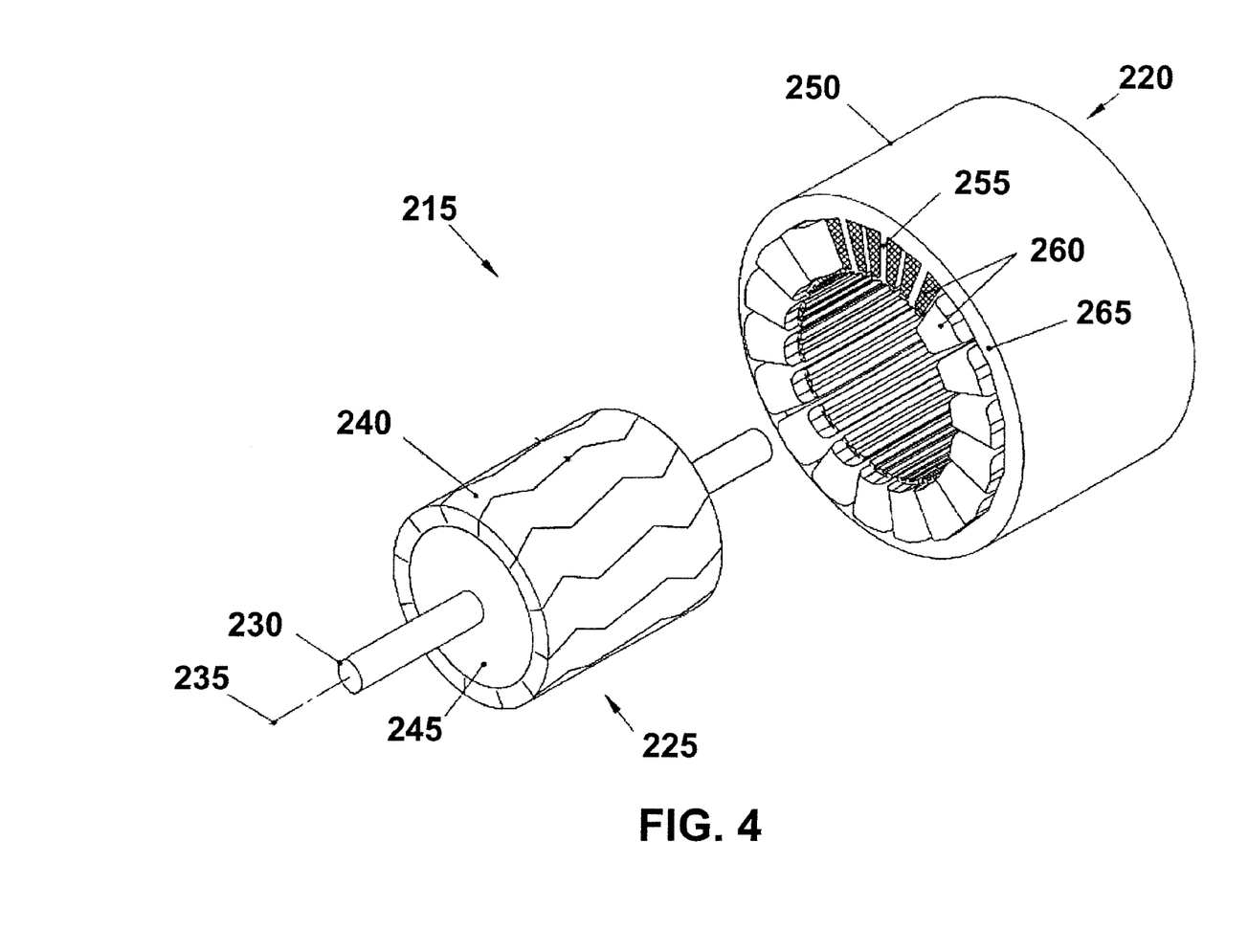
FIG. 4 is an exploded view of a stator/rotor assembly.

FIG. 4 illustrates a stator/rotor assembly 215 according to one construction of the motor assembly 25 schematically shown in FIG. 1. The stator/rotor assembly 215 includes a stator 220 and a rotor 225 mounted onto a shaft 230. The rotor 225 and the shaft 230 rotate about a rotational axis 235. In general, the stator 220 receives electrical power, and produces a magnetic field in response thereto. The magnetic field of the stator 220 interacts with a magnetic field of the rotor 225 to produce mechanical power on the shaft 230.

The rotor 225 can include a plurality of magnetic poles 240 of alternating polarity placed on the surface of a rotor core 245. The rotor core 245 can include laminations (e.g., magnetic steel laminations), and/or solid material (e.g., a solid magnetic steel core), and/or compressed powdered material (e.g., compressed powder of magnetic steel). In one construction of the stator/rotor assembly 215, the rotor 225 can include a sheet of permanent magnet (e.g., hard magnetic) material disposed on the rotor core 245. In another construction of the stator/rotor assembly 215, the rotor 225 can include a plurality of strips of permanent magnet material attached (e.g., with adhesive) around the rotor core 245. The magnet material can be magnetized by a magnetizer (not shown) to provide a plurality of alternating magnetic poles. Additionally, the number of magnetic strips can be different than the number of rotor magnetic poles. Yet in another construction of the stator/rotor assembly 215, the rotor 225 can include blocks of permanent magnet material placed substantially within the rotor core 245.

It is to be understood that the description of the stator/rotor assembly 215 in FIG. 4 is not limited to a particular mechanical construction, geometry, or position of the rotor 225 and stator 220. For example, FIG. 4 illustrates the rotor 225 operable to be located substantially within the stator 220 and is separated by a radial air gap from the stator 220. In other constructions of the stator/rotor assembly 215, the rotor 215 can be radially aligned and positioned to the exterior of the stator 220 (i.e., the machine is an external or outer-rotor machine.) Other constructions can include a motor assembly not explicitly described herein, such as an induction motor.

The stator 220 illustrated in FIG. 4 includes a stator core 250 having a plurality of stator teeth 255, stator windings 260, and a back iron portion 265. In some constructions, the stator core 250 can include a stack of magnetic steel laminations or sheets. In other constructions, the stator core 250 can be formed from a solid block of magnetic material, such as compacted powder of magnetic steel. The stator windings 260 can include electrical conductors placed in the slots and around the plurality of teeth 255. In other constructions of the stator 220, the stator core 250 and stator windings 260 can define configurations not defined herein, however such configurations are not limiting to the scope of the invention.

In some operations of the motor assembly 25 of FIG. 1, electrical current flows through the stator windings 260, producing a magnetic field that interacts with the magnetization of the rotor 225, thus generating a torque to the rotor 225 and shaft 230. The electrical current can have various types of waveforms (e.g., square wave, quasi-sine wave, etc). The stator windings 260 receive electrical current from an electrical drive circuit, such as the drive circuit illustrated in FIG. 5.

Figure 5:
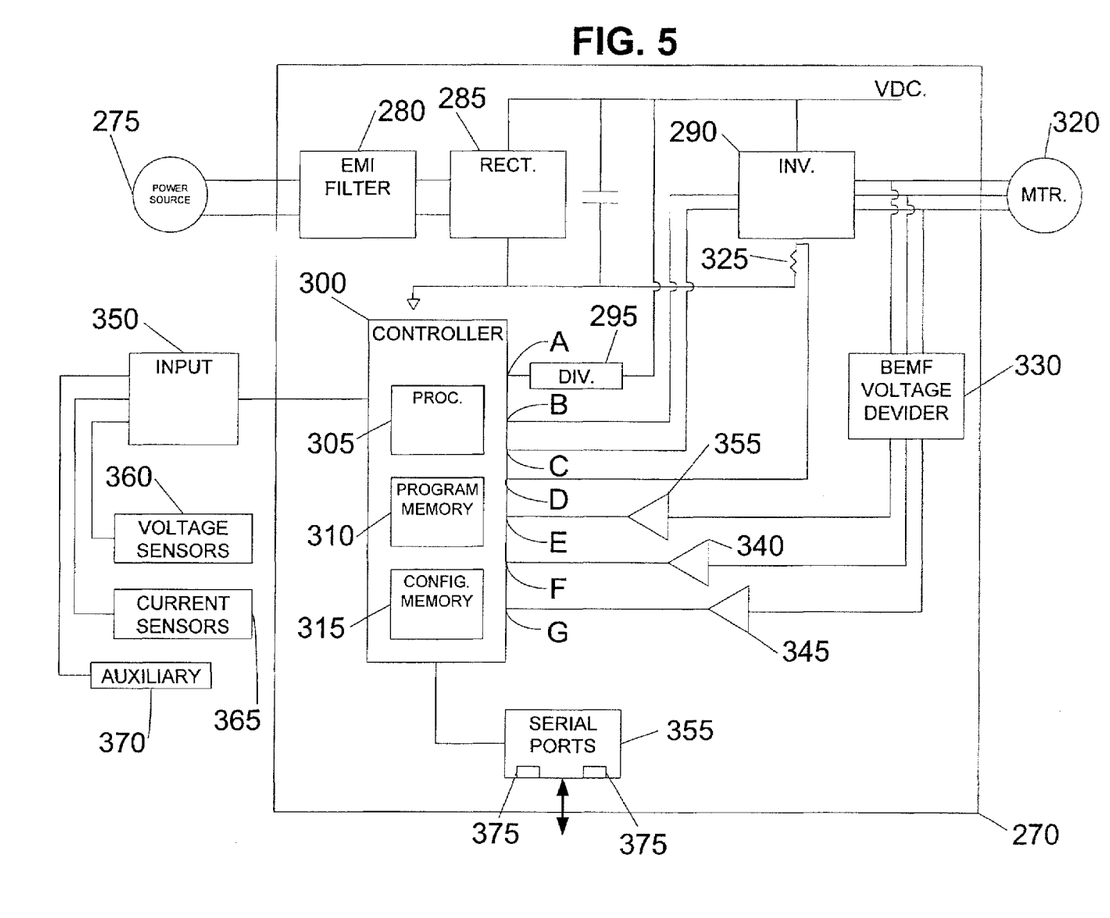
FIG. 5 is a schematic illustration of a drive circuit.

FIG. 5 illustrates a drive circuit 270 that receives power from a power source and drives the motor assembly 25 in response to an input. More particularly, the drive circuit 270 can receive AC power from a power source 275. The AC power is provided to a filter 280 and a rectifier 285 that filters and rectifies the AC power, resulting in a bus voltage VDC. The bus voltage VDC is provided to an inverter 290 and to a voltage divider 295. The voltage divider reduces the bus voltage to a value capable of being acquired by a controller 300 at a terminal A. The controller 300 includes a processor 305, a program memory 310, and a configuration memory 315. Generally, the processor 305 reads, interprets, and executes instructions stored in the program memory 310 to control the drive circuit 270, while the configuration memory 315 is designated to store characterization data and air flow demand information related to the HVAC system 10, such as explained in further detail below. The controller 300, which can be in the form of a microcontroller, can include other components such as a power supply, an analog-to-digital converter, and filters. The controller 300 issues drive signals at terminals B and C to control the inverter 290. The inverter 290 can include power electronic switches (e.g., MOSFETs, IGBTs) to vary the flow of current to a motor 320 of the motor assembly 25. In some constructions of the drive circuit 270, the inverter 290 can be in the form of a bridge circuit, for example. A resistor 325 can be used as a sensor to generate a voltage having a relation to the bus current of the inverter 290. The voltage at the resistor 325 is provided to the controller 300 at terminal D. The drive circuit 270 can also include other current sensors to sense bus current. It is envisioned that the controller 300 can receive signals indicative of phase currents and phase voltages provided by the inverter 290.

The drive circuit 270 can also include a back electro magnetic force (BEMF) voltage divider 330 couple to a first variable gain amplifier 335, a second variable gain amplifier 340, and a third variable gain amplifier 345. The BEMF voltage divider 330 and variable gain amplifiers 335, 340, 345 provide voltage values to the controller 300 at terminals E, F, and G. The voltage values provided to the controller 300 by each variable gain amplifier 335, 340, 345 can have a relation to the BEMF of each phase voltage, respectively.

During operation of the HVAC system 10, the motor controller 300 can control the motor 320 by providing drive signals to the inverter 290 based on inputs received at the controller 300. The controller 300 can receive input signals from an input interface 350, a serial port interface 355, the bus voltage channel, the bus current channel, and the BEMF voltages channels. The input interface 350 can be configured to receive input signals from one or more voltage sensors 360, current sensors 365, and auxiliary systems 370. Voltage sensors 360 and current sensors 365 can be used to measure voltages and currents, respectively, in the motor 320 or other devices operating in cooperation with the motor 320. Thus, the voltage sensors 360 and current sensors 365 can be coupled or placed within the motor 320, or alternatively, the sensors 360, 365 can be placed at a remote location. Moreover, the drive circuit 270 can be coupled or placed within the motor 320, or alternatively in close proximity to the motor 320. Signals generated by auxiliary inputs 370 can be received at the input interface 350 and can include signals from safety systems or other input/output devices 30 as schematically illustrated in FIG. 1.

In reference to FIGS. 3 and 5, the serial port interface 355 of the drive circuit 270 can be utilized to maintain two way communications with the system control board 20. The serial port interface 355 can allow the controller 300 to receive instructions from the system control board 20 to control the operation of the motor 320. The serial port interface 355 can also be used to alter the contents of the program memory 310 and configuration memory 315 of the controller 300. For example, a manufacturer of the drive circuit 270 can program the program memory 310 with instructions specific to the operation of the motor 320, and the configuration memory 315 with characterization data and air flow demand information specific to the HVAC system 10 defined by the system control board 20, the thermostat 15, and the motor assembly 25. Similar to the serial ports 130 of the system control board 20, the drive circuit 270 can incorporate more than one serial port 375 to simultaneously allow programming the controller 300 by a user, and to communicate with the system control board 20 to operate the motor 320. In one construction of the drive circuit 270, one serial port 375 can be utilized to maintain two-way communication with the system control board 20, and another serial port 375 can be utilized to communicate the motor 320 with other input/output devices 30 such as control systems, other motors, sensors, and controllers. In other constructions of the drive circuit 270, the serial port interface 355 can include more than two serial ports 375 to communicate the motor assembly 25 simultaneously to other devices.

In some constructions of the HVAC system 10, the thermostat 15, system control board 20, and motor assembly 25 are configured to operate the HVAC system 10 utilizing a set of specific modes of operation. For example, the thermostat 15 can detect a temperature and generate signals indicative of temperature adjustment requirements. The signals generated by the thermostat 15 can be sent to the system control board 15. In some cases, the system control board 15 can be used to simultaneously control the HVAC system 10 and other input/output devices 30 such as auxiliary systems or safety devices (e.g. smoke detection systems, alarm systems, ambient humidity control). The system control board 20 can process the signals generated by the thermostat 15 to generate instructions for the motor assembly 25 based on the mode of operation of the system control board 20 and the status of the HVAC system 10. The motor assembly 25 can receive the instructions from the system control board 20, utilizing the serial port interface 355, to drive a blower or a fan (not shown) producing generally a constant air flow, for example.

Figure 6:
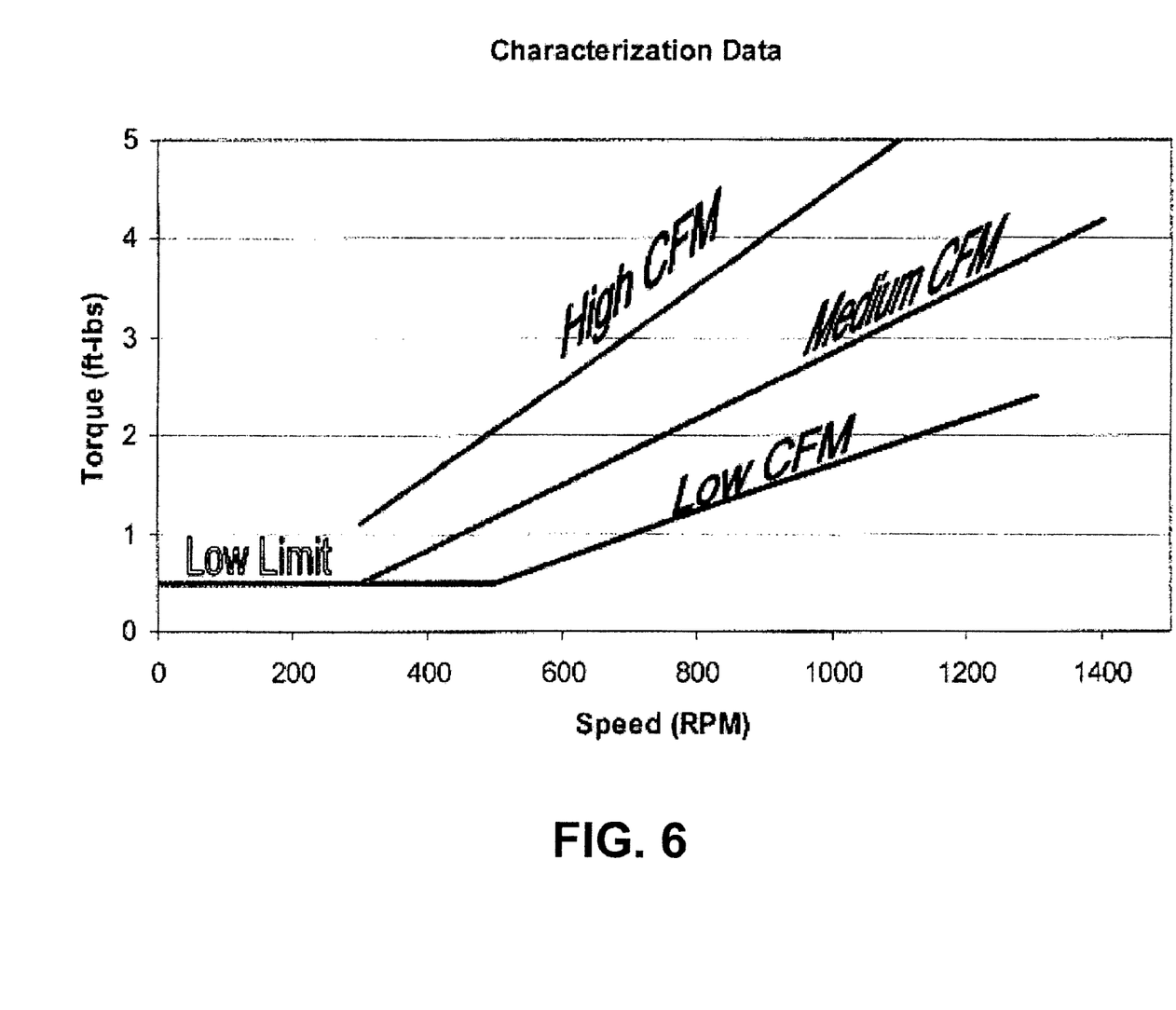
FIG. 6 is a plot illustrating characterization data capable of being used in the HVAC system in FIG. 1.

In some constructions of the HVAC system 10, the characteristics of an air movement system (determined by a set of numerical values defined as characterization data) coupled to the HVAC system 10 can be programmed in the controller 300 of the motor assembly 25. FIG. 6 is a graphical representation of characterization data defined in cubic-feet-per-minute (CFM) for an air movement system. The data in FIG. 6 is illustrated on a torque versus speed plot. The characterization data can help process the instructions generated by the system control board 20 to drive a blower coupled to the motor 320. The plot in FIG. 6 includes lines labeled as low CFM, medium CFM, and high CFM. The lines are graphical representations of a dataset comprising values indicative of an airflow, a slope, an offset, and a low limit defining the characterization data.

The low limit line generally indicates the parameters at which the motor becomes less capable of maintaining a constant CFM. The low limit information allows controlling the motor 320 to help prevent the motor 320 from operating at a state characterized by parameters below the low limit shown in FIG. 6. The characterization data corresponding to other HVAC systems can include a different number of lines (different data set) defining alternatively other values of CFM, low limits, and off sets. For example, a more sophisticated HVAC system can include a relatively larger amount of characterization data to be stored in the controller of the corresponding motor assembly. In another example, a controller of an alternative HVAC system can include instructions to interpolate additional lines (similar to the lines shown in FIG. 6) between the lines representing previously stored CFM characterization data, and/or other parameters of the alternative HVAC system.

Various methods to operate the HVAC system will now be described. It is to be understood that the methods described are not limiting to the scope of the invention and other methods of operation are possible.

Exemplary Method 1

For this method of operation, characterization data related to the HVAC system 10 can be stored in the memory 310 of the motor assembly 25, and air flow demand information can be stored in the memory 145 of the system control board 20. The system control board 20 can receive signals from the thermostat 15 and generate instructions to operate the motor assembly 25 based on the received signals. The instructions generated by the system control board 20 can also be dependent upon four modes of operation of the system control board, for example. It is to be understood that the system control board 20 can include a different number of modes of operation.

The four modes of operation of the system control board 20 can usually be defined as: CFM, constant speed, constant torque, and constant voltage. Each one of the modes of operation can help dictate the type of command to be sent from the system control board 20 to the motor assembly 25. In one example, the thermostat 15 can generate a signal requesting a blower to be turned on. The system control board 20 receives the signal and the controller 135 processes the signal based on the current mode of operation. If the system control board 20 is operating in the constant speed mode, the system control board 20 can generate a command such as "GO AT 800 RPM" instructing the motor assembly 25 to operate the blower at 800 rpm. If the system control board 20 is operating in the constant torque mode or the constant voltage mode, the system control board 20 can generate commands such as "GO TORQUE MODE AT 4" or "GO SPEED MODE AT 800," respectively. The commands generated by the system control board 20 instruct the motor assembly 25 to operate at 4 ft-lbs of force or to operate at 800 RPM, respectively. It can be observed that the system control board 20 can generate standard commands, such as "GO AT," modified by the different modes of operation. Other commands generated by the system control board 20 can include a "STOP" command indicative of a state when the thermostat 15 no longer sends the signal requesting to turn on the blower.

A command generated by the system control board 20 in the CFM mode can require relatively more computational steps from the controller 300 of the motor assembly 25 to operate the blower. The command generated by the system control board 20 can look substantially similar to the commands generated in other modes. For example, "GO CFM MODE AT 500" instructs the motor assembly 25 to operate the blower to generate a constant air flow of 500 CFM. In this particular example, the motor assembly 25 can perform a number of steps in series or simultaneously, such as adjusting torque and velocity, to maintain the production of air flow at 500 CFM. The modes of operation of the system control board 20 can be adjusted by a user or technician utilizing the switch board 125, the input ports 115, the output ports 120, or the serial ports 130. It is envisioned that all, or a combination, of the operation modes can be active simultaneously, allowing the processor 140 of the system control board 20 to determine what command to generate based on the signals received from the thermostat 15 and the status of the HVAC system 10.

Exemplary Method 2

For this method of operation, the controller 300 of the drive circuit 270 generally requires additional memory space in comparison to the controller 300 as operated in Exemplary Method 1. To this end, the controller 300 of the motor assembly 25 can include program memory 310 and configuration memory 315, as illustrated in FIG. 5. It is to be understood that FIG. 5 schematically shows the program memory 310 and the configuration memory 315 as distinct elements helping illustrate the additional memory requirements of the processor 300. However, it is possible that the program memory 310 and configuration memory 315 define one physical embodiment including two or more types of information and/or instructions occupying the memory space.

For this method of operation, information including characterization data and air flow demand corresponding to the HVAC system 10 can be programmed in the processor 300 of the motor assembly 25. Another characteristic of this method of operation can be removing air flow demand information from the memory 145 in the system control board 20. The system control board 20 can receive signals generated by the thermostat 15 and generate commands for the motor assembly 25 to operate the blower. The commands generated by the system control board 20 can be independent of the mode of operation of the system control board 20. Additionally, the commands generated by the system control board 20 can be generic for most of the signals received from the thermostat 15.

In one example, the thermostat 15 can generate a signal requesting the blower to be turned on. The system control board 20 can receive the signal generated by the thermostat 15 and create a command "GO TABLE 2", including a generic portion and a memory address, to be sent to the motor assembly 25. In this particular case, the generic portion of the command corresponds to "GO TABLE", and the memory address is illustrated by the number 2. The system control board 20 can substantially relay the signal generated by the thermostat 20 to the motor assembly 25 by creating a command "GO TABLE" and a memory address, a numeric value or table address (e.g. 2). A dedicated numeric value generally corresponds to a particular signal generated by the thermostat 15. The motor assembly 25 can receive the command generated by the system control board 20 and match the numeric value with one of a plurality of values stored in the controller 300. The plurality of numeric values can correspond to air flow demand information programmed in at least one of the program memory 310 and configuration memory 315. In this particular example, the value of 2 can be indicative of instructions for running the motor at 800 RPM or at 2 ft-lbs of force, or to generate 500 CFM.

In some cases, a signal generated by thermostat 15, processed by the system control board 20, and sent to the motor assembly 25 can cause the motor assembly 25 to operate for a time frame after the thermostat 15 has stopped generating the signal. For example, the thermostat 15 can generate a heating command, and as a result the system control board 20 generates a command "GO TABLE X" (where X is a numeric value) to operate the motor assembly 25. After the thermostat 15 stops generating the heating command, it is possible that the motor assembly 25 operates as if still receiving the "GO TABLE X" command or as in a ramping profile. In other words, it is possible that the motor assembly 25 is a manner not specified after the thermostat 15 stops generating a command. In these cases, the system control board 20 can generate a time delay command or timing profile to help prevent the motor assembly 25 from operating after the thermostat 15 stops generating a command. Alternatively, instructions related to the time delay command or timing profile can be programmed in the processor 300 of the motor assembly 25.

A table with exemplary numeric values generated by the system control board 20 that can be matched with the "GO TABLE" command are provided below.

01=Fan only for filtration
02=Low cool fan
03=High cool fan
04=Low heat
05=High heat
06=Emergency heat
07=Slow start to low heat
08=Low cool fan +10%
09=Low cool fan −15%
10=High cool fan −10% etc.

It can be observed from the table above that the system control board 20 can generate commands (e.g. "GO TABLE 2") including numeric values generally indicative of specific signals generated by the thermostat 15. As a consequence, the system control board 20 can be utilized in cases when another motor assembly 25 and/or blower replace the original motor assembly 25. For example, in cases when the HVAC system 10 is upgraded or replaced, the motor assembly 25 generally needs to be reprogrammed to include the characterization data, air flow demand data, or motor demand information corresponding to the new HVAC system characteristics. It is also possible for the motor assembly 25 to include air flow demand information for more than one HVAC system from the factory. Thus, the motor assembly 25 may only require receiving an upgrade command to acknowledge the presence of the new HVAC system and to operate with the present system control board 20. An upgrade command can be generated by the system control board 20 or by a user utilizing a computer connected to the motor assembly 25 at the serial port interface 355. The upgrade command can also be sent to the motor assembly 25 via the input interface 350.

Exemplary Method 3

This particular method of operation is characterized by the system control board 20 relaying signals generated by the thermostat 15, and the motor assembly 25 including the characterization data and air flow demand data related to the HVAC system 10 in at least one of the program memory 310 and configuration memory 315. Generally, thermostats 15 can generate standard or generic signals regardless of manufacturer, and the signals can be processed and/or relayed to the motor assembly 25 by the system control board 20. Some signals that can be generated by thermostats, such as the one schematically illustrated in FIGS. 1 and 2, are:

| | |
|---|---|
| Heating | W |
| Heating: 1st Stage | W1 |
| Heating: 2nd Stage | W2 |
| Heating: 3rd Stage | W3 |

-continued

| | |
|---|---|
| Cooling | Y |
| Cooling: 1st Stage | Y1 |
| Cooling: 2nd Stage | Y2 |
| Cooling: 3rd Stage | Y3 |
| Fan | G |
| Defrost | DF |
| Emergency Heat Relay | E |
| Lockout Reset | X |

For example, the system control board 20 can generate a command, such as "RUN STATE" in response to receiving a new or revised signal from the thermostat 15. Alternatively, the system control board 20 can periodically read the states of the signals of the thermostat 15 and generate a new or revised "RUN STATE" command in response thereto. After the command is generated, the system control board 20 transmits information related to the signals generated by the thermostat 15. In some cases, serial bits can be communicated from the system control board 20 to the motor assembly 25, where the first bit can be signal W, for example, the second bit can be signal W1, the third bit can be W3, and so on. Alternatively, the information after the generated command can include a first portion identifying an address to be changed at the motor assembly 25 (e.g., address 4, which relates to cooling) and a second portion identifying a new value. Other similar communication schemes are possible.

The motor assembly 25 can receive the command and information from the system control board 20, and respond to the communicated information as appropriate. For example, the drive circuit 270 can analyze the one or more thermostat states received from the system control board 20 and obtain or determine the proper motor control instructions/procedures in response thereto.

In some cases, the motor assembly 25 can operate for a time frame after the thermostat 15 has stopped generating a signal or command, similar to the operation described in Exemplary Method 2. In these cases, the system control board 20 can also generate a time delay command or timing profile to help prevent the motor assembly 25 from operating after the thermostat 15 stops generating a command. Alternatively, instructions related to the time delay command or timing profile can be programmed in the processor 300 of the motor assembly 25.

In addition to the methods described above, the motor assembly can operate under other methods of operation defined by the HVAC system 10. Moreover, other commands besides "GO AT", "GO TABLE", and "RUN STATE" can be generated for each one of the methods of operation described above. Also, other commands may be generated by the system control board equivalent to the commands "GO AT", "GO TABLE", and "RUN STATE."

In reference to the Exemplary Methods 1, 2, and 3, it is envisioned that the motor assembly 25 can recognize and operate under the three methods described simultaneously. For example, a user may program the system control board 20 utilizing the switch board 125 allowing all, or a combination, of the Exemplary Methods 1, 2, and 3 to be operational. The system control board 20 can then generate commands characterized by either one of the methods of operation based on the input received from the thermostat 15 and the status of the HVAC system 10.

Various features and advantages of the invention are set forth in the following claims.

What is claimed is:

1. An air movement system comprising:
a blower;
an external controller operable to receive signals from a sensing device and generate a command based on the received signals, the command including an address;
a communication channel coupled to the external controller and configured to communicate the command;
a motor assembly operable to drive the blower, the motor assembly including
a stator and rotor assembly coupled to the blower, and
a drive circuit coupled to the stator and rotor assembly and having a second controller and a memory, the memory including a set of data having a plurality of addresses and an instruction associated with each address, respectively, of the plurality of addresses, the second controller being coupled to the communication channel, the second controller being configured to receive the command, to obtain an instruction from the set of data using the address of the command, and to drive the stator and rotor assembly based on the obtained instruction.

2. The movement system of claim 1, wherein the sensing device includes a thermostat.

3. The movement system of claim 2, further comprising a second communication channel directly coupling the thermostat and the motor assembly such that the motor assembly drives the blower based on signals received from the thermostat via the second communication channel.

4. The movement system of claim 1, wherein the sensing device includes a temperature sensor.

5. The movement system of claim 1, wherein the second controller includes the memory.

6. The movement system of claim 1, wherein the communication channel includes a serial communication channel.

7. The movement system of claim 1, wherein the memory further includes a second set of data corresponding to characterization data of the air movement system.

8. The movement system of claim 1, wherein the set of data includes a first address and a first instruction associated with the first address, and the set of data further includes a second address and a second instruction associated with the second address.

9. The movement system of claim 8, wherein the first instruction includes a first speed demand and the second instruction includes a second speed demand.

10. The movement system of claim 8, wherein the first instruction includes a first torque demand and the second instruction includes a second torque demand.

11. The movement system of claim 8, wherein the first instruction includes a first air-flow demand and the second instruction includes a second air-flow demand.

12. The movement system of claim 8, wherein the first instruction includes a first time delay and the second instruction includes a second time-delay.

13. The movement system of claim 8, wherein the first instruction includes a first timing profile and the second instruction includes a second timing profile.

14. The movement system of claim 8, wherein the first instruction includes a first speed demand and a first timing profile, and the second instruction includes a second speed demand and a second timing profile.

15. The movement system of claim 8, wherein the first instruction includes a first air flow demand and a first timing profile, and the second instruction includes a second air flow demand and a second timing profile.

16. The movement system of claim 1, wherein the address of the command includes an indication of the status of the air movement system.

17. The movement system of claim 1, wherein the air movement system further comprises a thermostat having the external controller, and wherein the address indicates a state of the thermostat.

18. The movement system of claim 1, wherein the address relates to a state of the air movement system.

19. A method for assembling an air movement system, the method comprising:
providing an external controller operable to receive signals from a sensing device, and generate commands based on the received signals, the command including an address;
providing a motor assembly including
a stator and rotor assembly operable to drive a blower, and
a drive circuit having a second controller and a memory;
coupling the external controller to the second controller with a communication channel;
programming the memory with a first set of data corresponding to characterization data of the air movement system; and
programming the memory with a second set of data having a plurality of addresses and an instruction associated with each address, respectfully, of the plurality addresses.

20. The method of claim 19, wherein the programming the memory with a second set of data includes relating the plurality of addresses to the instruction associated with each address, respectfully.

21. The method of claim 19, wherein coupling the external controller to the second controller includes providing a serial cable and connecting the external controller to the second controller with the serial cable.

22. The method of claim 19, further comprising directly coupling a thermostat to the external controller.

23. The method of claim 19, further comprising directly coupling a thermostat to the motor assembly.

24. A method of operating an air movement system including
a blower,
an external controller, and
a motor assembly having
a stator and rotor assembly coupled to the blower, and
a drive circuit coupled to the stator and rotor assembly, having a second controller coupled to the external controller via a communication channel, and a memory including a first set of data having a plurality of addresses and an instruction associated with each address, respectively, and a second set of data corresponding to characterization data of the air movement system, the method comprising:
receiving a first signal with the external controller;
generating a command based on the first signal, the command including an address;
transmitting a second signal from the external controller to the second controller, the second signal including the command;
processing the second signal;
selecting an instruction from the first set of data based on the address of the command and the plurality of addresses of the set of data; and
driving the blower with the motor according to the selected instruction.

25. The method of claim 24, further comprising selecting an instruction from the second set of data based on the address of the command and the plurality of addresses of the set of data.

26. The method of claim 24, wherein the second controller includes the memory.

27. The method of claim 24, wherein receiving the first signal includes receiving the first signal from a thermostat coupled to the external controller.

28. The method of claim 24, wherein the generating a command includes generating the address corresponding to an address in the first set of data.

29. The method of claim 28, wherein selecting data includes
relating the address of the command to an address of the first set of data, and
selecting the instruction associated with the related address of the first set of data.

30. The method of claim 24, wherein the generating a command includes generating the address corresponding to an address in the second set of data.

31. The method of claim 24, wherein the generating a command includes generating the address indicating a state of the air movement system.

32. The method of claim 24, wherein the air movement system includes a thermostat, and wherein the generating a command includes generating the address indicating a state of the thermostat.

33. The method of claim 24, wherein the transmitting a second signal includes transmitting the second signal via a serial cable.

34. The method of claim 24, further comprising
sending a delay signal from the external controller to the second controller,
processing the delay signal by the second controller, and
driving the blower according to the processed delay signal.

35. The method of claim 24, wherein the selected instruction includes a speed demand, and wherein the driving the blower with the motor is according to the speed demand.

36. The method of claim 24, wherein the selected instruction includes a torque demand, and wherein the driving the blower with the motor is according to the torque demand.

37. The method of claim 24, wherein the selected instruction includes an air flow demand, and wherein the driving the blower with the motor is according to the air flow demand.

38. The method of claim 24, wherein the selected instruction includes a timing profile, and wherein the driving the blower with the motor is according to the timing profile.

39. The method of claim 24, wherein the selected instruction includes a speed demand and a timing profile, and wherein the driving the blower with the motor is according to the speed demand and the timing profile.

40. The method of claim 24, wherein the selected instruction includes an air-flow demand and a timing profile, and wherein the driving the blower with the motor is according to the air flow demand and the timing profile.

41. A method of operating an air movement system including
a blower;
an external controller,
a motor assembly having
a stator and rotor assembly coupled to the blower, and
a drive circuit coupled to the stator and rotor assembly, having a second controller coupled to the external controller, the second controller having a first set of data with a plurality of addresses and an instruction associated with each address, respectively, and a second set of data corresponding to characterization data of the air movement system, and a thermostat coupled to the external controller, the method comprising:

receiving a first signal from the thermostat with the external controller;

generating a command based on the first signal, the command including a status portion;

sending a second signal including the command from the external controller to the second controller;

processing the second signal;

selecting an instruction from the first set of data based on the status portion and the plurality of addresses of the first set of data; and driving the blower with the motor according to the selected instruction.

42. The method of claim 41, wherein the generating the status portion includes generating the status portion based on a state of the air movement system.

43. The method of claim 41, wherein the generating the status portion includes generating the status portion based on a state of the thermostat.

44. The method of claim 41, wherein the selecting an instruction includes relating the status portion to an address of the first set of data, and selecting the instruction associated with the related address of the first set of data.

45. The method of claim 41, wherein the selecting an instruction includes relating the status portion to an address of the second set of data, and selecting the instruction associated with the related address of the second set of data.

46. The method of claim 41, wherein the transmitting a second signal includes transmitting the second signal via a serial cable.

47. A method of operating an air movement system including a blower, a thermostat, and a motor assembly having a stator and rotor assembly coupled to the blower, and a drive circuit coupled to the stator and rotor assembly, having a second controller coupled to the thermostat, the second controller having a first set of data having a plurality of addresses and an instruction associated with each address, respectively, and a second set of data corresponding to characterization data of the air movement system, the method comprising:

receiving a first signal from the thermostat with the external controller;

generating a command based on the first signal, the command including a status portion;

sending a second signal including the command from the thermostat to the second controller;

processing the second signal;

selecting an instruction from the first set of data based on the status portion and the plurality of addresses of the set of data; and driving the blower with the motor according to the selected instruction.

48. The method of claim 47, wherein the generating the status portion includes generating the status portion based on a state of the thermostat.

49. The method of claim 47, wherein the selecting an instruction includes relating the status portion to an address of the first set of data, and selecting the instruction associated with the related address of the first set of data.

50. The method of claim 47, wherein the selecting an instruction includes relating the status portion to an address of the second set of data, and selecting the instruction associated with the related address of the second set of data.

51. The method of claim 47, wherein the transmitting a second signal includes transmitting the second signal via a serial cable.

* * * * *